March 11, 1969 R. EARLING ET AL 3,431,695
APPARATUS AND PROCESS FOR PRODUCING FROZEN CONFECTION
PACKAGES WITH SPOON PROJECTING THROUGH LID
Filed Dec. 22, 1966

INVENTORS
ROY EARLING
FRANK J. SCHEUERMAN

BY *William W. Stokes*

ATTORNEY

INVENTORS
ROY EARLING
FRANK J. SCHEUERMAN

BY William W Stokes

ATTORNEY

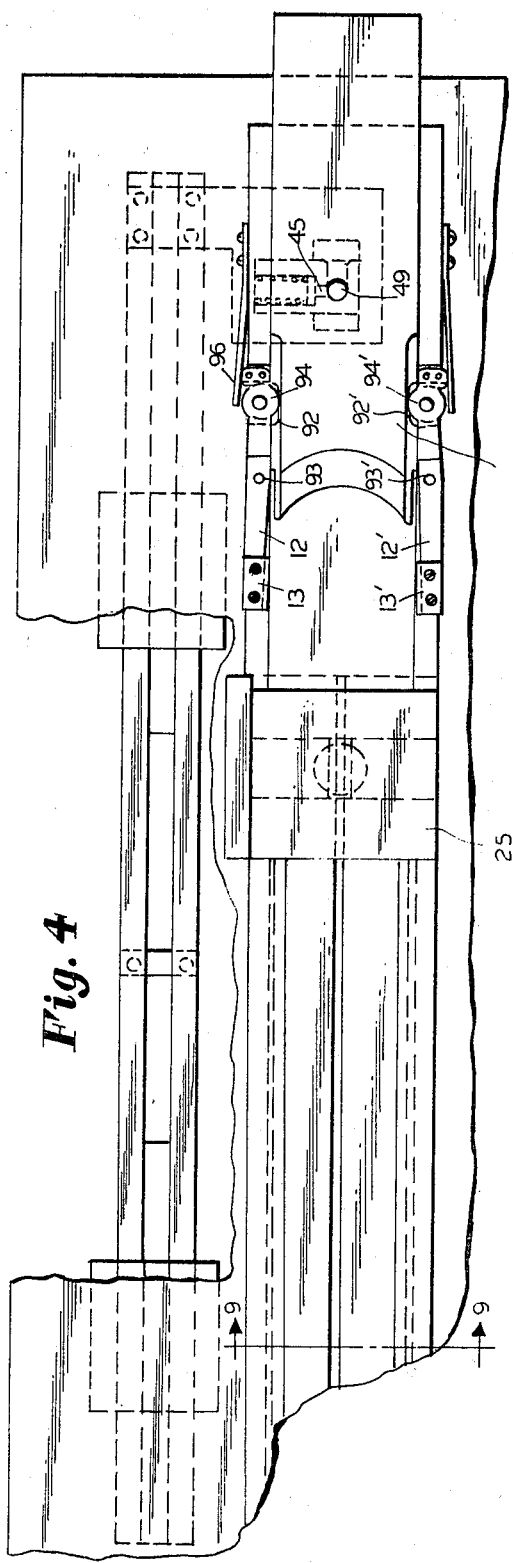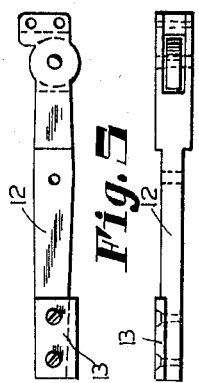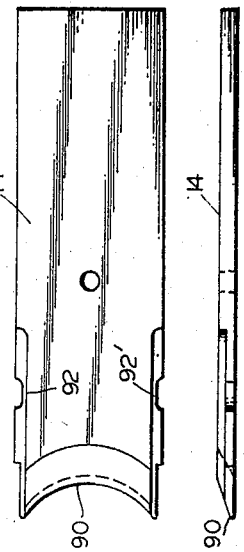
INVENTORS
ROY EARLING
FRANK J. SCHEUERMAN
BY William W. Stokes
ATTORNEY

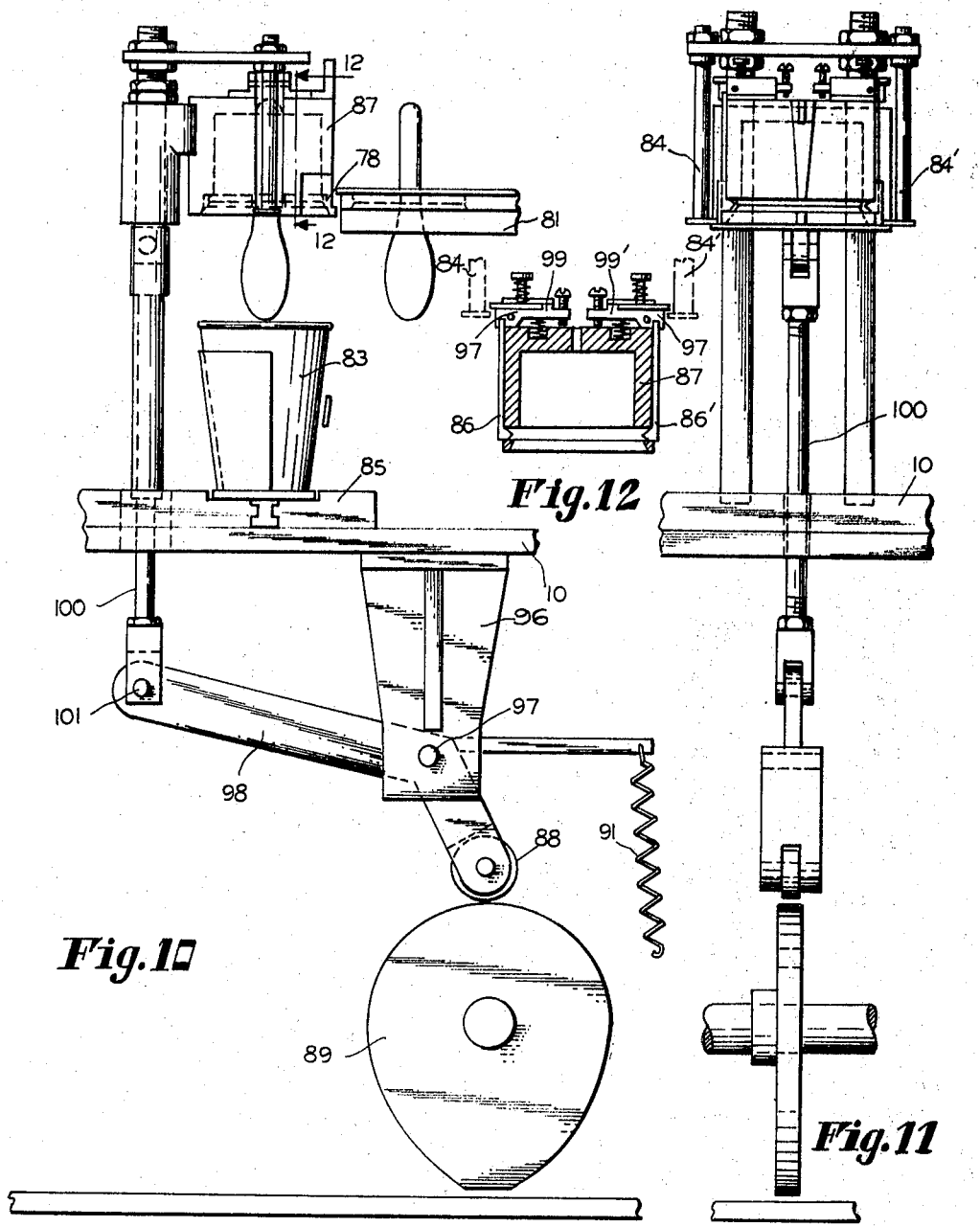

United States Patent Office 3,431,695
Patented Mar. 11, 1969

3,431,695
APPARATUS AND PROCESS FOR PRODUCING FROZEN CONFECTION PACKAGES WITH SPOON PROJECTING THROUGH LID
Roy Earling and Frank J. Scheuerman, Baltimore, Md., assignors of thirty-three and one-third percent to Harold W. Bentham, Baltimore, Md.
Filed Dec. 22, 1966, Ser. No. 603,997
U.S. Cl. 53—15      9 Claims
Int. Cl. B65b 61/00; B68b 5/02, 3/22

ABSTRACT OF THE DISCLOSURE

An apparatus having a gravity slide for feeding a continuous supply of lids and spoons, a slide for synchronously feeding a single lid and single spoon to an assembly head which positions the handle of the spoon in perpendicular relationship with the underside of the lid, a solenoid powered striking means to strike the spoon at the tip of its bowl to drive it through the lid and a capping head which applies a downward pressure to place the lid/spoon on a container of liquid confection which can then be frozen.

---

With the above broad abstract of the invention in mind, the apparatus and process can be better understood by brief reference to the confection package produced thereby.

This invention relates to the automatic insertion of a stick or spoon through the lid of an ice cream or confection container and the placement of the spoon/lid assembly on a container of liquid confection which is subsequently frozen.

Essentially, the package produced by the machine and process of this invention comprises a container member such as a cup containing the frozen confection, a lid member for the container and a spoon member. The bowl portion of the spoon member is frozen in the ice cream. The handle portion projects through the lid member.

The result is a highly advantageous package for a frozen confection allowing it to be eaten from the stick or eaten with a spoon as desired. It is an especially desirable package for children, who particularly favor frozen on the stick confections. The packaged confection produced by the machine of this invention can be started "on the stick" and finished with a spoon. Invariably, especially with smaller children, a "Popsicle" or frozen on the stick becomes runny and messy and often falls off the stick. The confection herein described has the advantages of a lid which can be used as a shield to protect from dripping and the added feature that the confection can be returned to the container at any time and finished with the spoon.

All these advantages are accomplished with insignificant cost increase over known frozen confection packages.

It is therefore the object of this invention to provide a machine which is capable of producing the above described confection package.

A specific object of this invention is to provide a machine capable of driving a spoon through the lid of a confection package.

Another specific object is to provide a machine for completing the confection package by placing the lid/spoon combination on a container of liquid ice cream or confection mix which then can be frozen.

Another object of this invention is the provision of a process for the production of the unique confection packages herein described.

A more specific object of the present invention is to provide a machine and process for the insertion of a spoon through a lid without any previous preparation of the lid, such as slotting or slitting.

Another specific object is to produce a lid/spoon combination having a tight, hygenically acceptable fit.

Still a further object is to accomplish these purposes rapidly with a minimum of labor and in a highly economic manner.

With the above objects in view, the invention will be clearly understood by reference to the accompanying drawings in which:

FIGURE 4 is a top plan view of the lid/spoon assembly apparatus with a table cutaway to show the reciprocating slide bar.

FIGURE 5 is a top plan view of a lid separating finger.

FIGURE 6 is a side elevation of a lid separating finger.

FIGURE 7 is a top plan view of the lid feed slide.

FIGURE 8 is a side elevation of the lid feed slide.

FIGURE 9 is a sectional view of the slotted lid/spoon channel taken along the lines 9—9 of FIGURE 4.

FIGURE 10 is a side elevation of the lid/spoon and cup assembly apparatus.

FIGURE 11 is a front elevation of the lid/spoon and cup assembly apparatus.

FIGURE 12 is a detail section of the lid/spoon and cup assembly head in capping position taken along the lines 12—12 of FIGURE 11.

Figure 1:
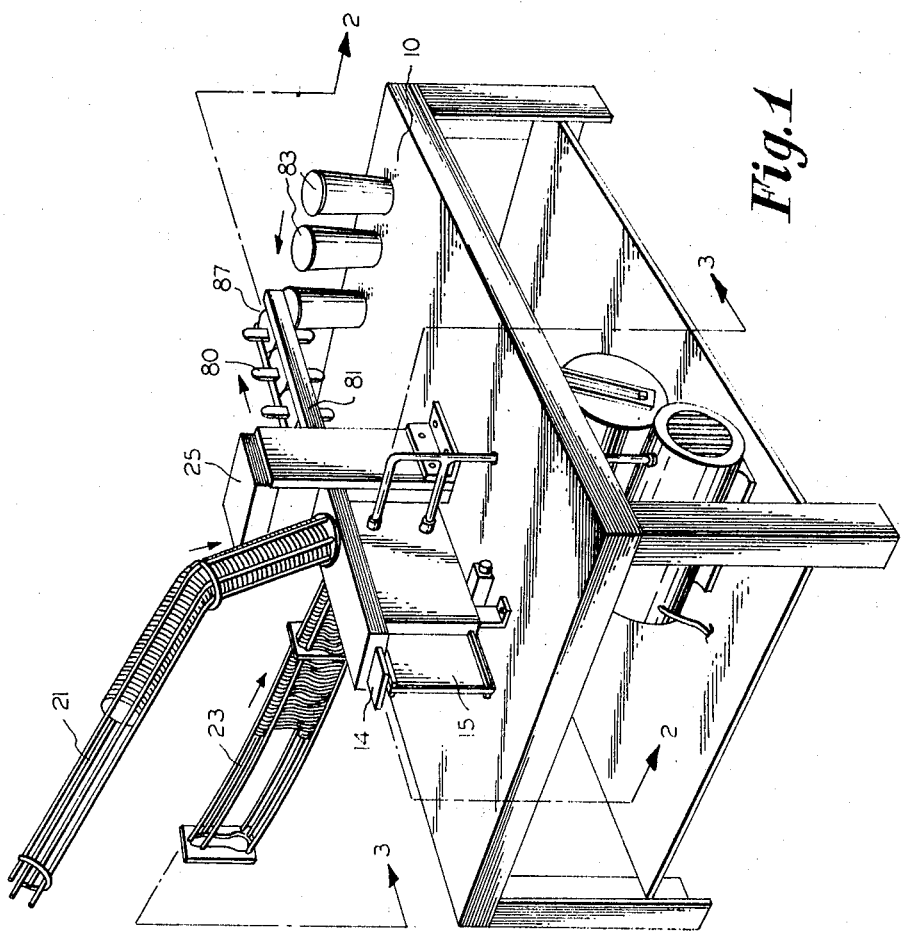
FIGURE 1 is a perspective view of the lid/spoon assembly apparatus schematically illustrating the location of the spoon/lid and container assembly apparatus.

An overall concept of the invention is revealed by FIGURE 1 showing the device of this invention mounted on the table 10. The assembly head 25 which will be further described hereinafter contains the device by which the spoons are driven through the lids. The lids are depicted in position in the lid feed rack 21 while the spoons are in the spoon feed rack 23. Both are wire or tubular gravity slides.

The lids are positioned in the assembly head 25 by means of the lid feed slide 14 and the spoons are delivered by the spoon feed slide 15. The completed lid/spoon assemblies 80 are pushed along the slotted channel 81 by the subsequently assembled lid/spoon combinations. Cups 83 containing a liquid confection adapted to be frozen are supplied (as shown schematically) to the point 87 where the lid/spoon and cup assembly head is located.

Figure 2:
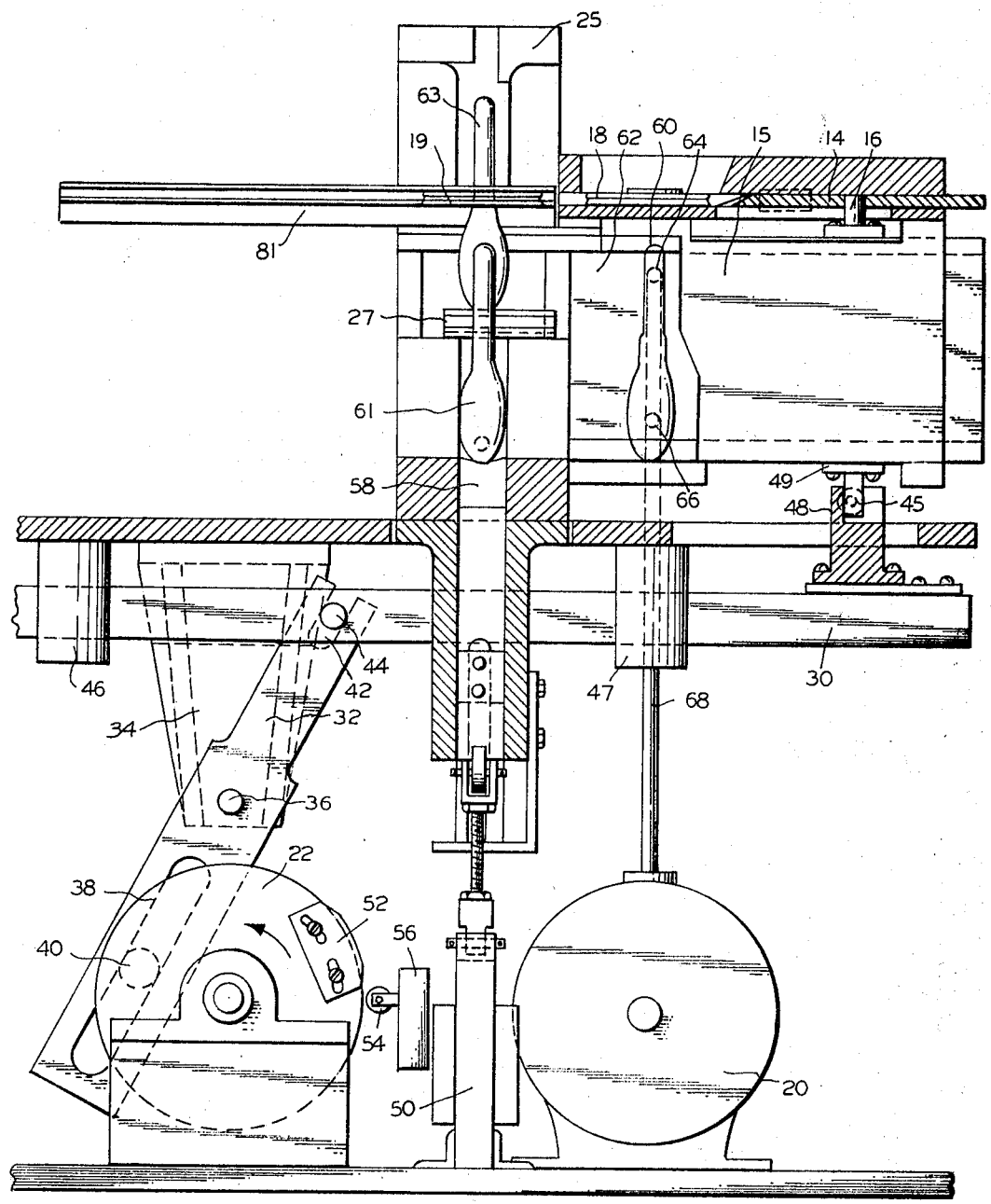
FIGURE 2 is a sectional view of the lid/spoon assembly apparatus taken along the lines 2—2 of FIGURE 1.
Figure 3:
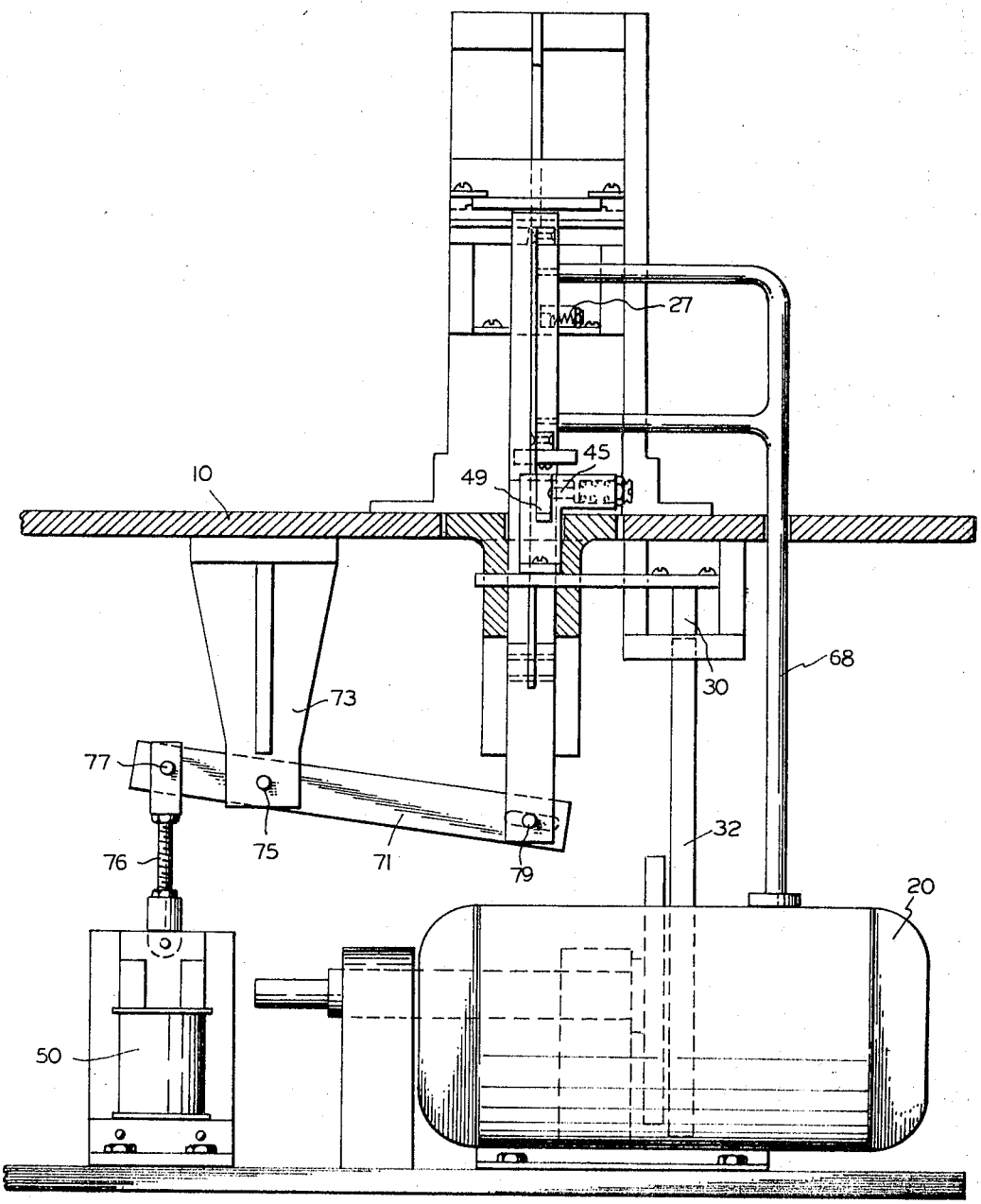
FIGURE 3 is a sectional view taken along the lines 3—3 of FIGURE 1.

FIGURES 2 and 3 describe the lid/spoon assembly device with more detail. The disc 22 is driven in a counterclockwise direction by a power source such as an electric motor. From this disc emanates the power for both the spoon and lid feeding mechanisms. Rotary motion of the disc is changed into reciprocating motion of the reciprocating drive bar 30 by means of connecting arm 32 is pivotally mounted at 36 from the bracket 34 mounted beneath the table 10. The connecting arm 32 is slotted at 38 to slidably engage the stud 40 on the disc 22.

Rotary motion in the disc causes the connecting arm 32 to reciprocate at its opposite end which is provided with an open slot at 42. The open slot in turn slidably engages a stud 44 on the reciprocating drive bar 30 mounted in the supports 46 and 47 allowing the drive bar to undergo a reciprocal motion.

At the opposite end of the reciprocating drive bar 30, a notched block 48 is adapted to receive a bar 49 which is attached to the underside of the spoon feed slide 15. The bar 49 is moved and the spoon feed slide 15 are moved to the right as shown in FIGURE 2 by engagement with the wall on the notched block 48. On the feed stroke, use is made of the safety assembly provided on the block 48 and the bar 49.

The bar 49 has a small depression in its side. Attached to the side of the block 48 is a spring loaded rod 45 having a rounded tip which fits closely into the depression in the bar 49. By this means the spoon feed slide is moved on the feed stroke. It can be readily seen if a jam up occurs the spring loaded rod 45 will pop out of position on the feed stroke and damage to the mechanism will be prevented.

The spoon feed slide 15 is shaped with a shoulder as shown in FIGURE 2. The upper portion is vertical to engage the handle of the spoon, a shoulder avoids the rounded portions of the spoon. The lower indented vertical portion is adapted to meet the bowl portion of the spoon at its widest point and consequently, when the spoon feed slide operates to engage the spoon it does so with the spoon in a vertical orientation.

As was seen in FIGURE 1 the spoons are gravity fed down a slide 21. A spoon 60 is shown in its original position against the backing plate 62. The spoon is held in position and straightened, if need be, by means of vacuum outlets 64 and 66 connected to vacuum line 68 and vacuum pump 20. In this position, drawn flat by the vacuum against the backing plate, the spoon is ready for feeding to the assembly head 25. Experience has shown that vacuum straightening or flattening need only be used with wooden spoons which have a tendency to warp. Plastic spoons are preferred since the warping problem is eliminated and the use of vacuum is not required.

A stud 16 on the upper portion of the spoon feed slide 15 fits into a hole in the lid feed slide 14 to drive the lid feed slide and spoon feed slide in synchronization.

A lid 18 is shown in its original position about to be pushed into the assembly block 25 by the lid feed slide 14. The lids are fed to the position 18 by means of the slide 21 shown in FIGURE 1. As will be hereinafter described, provision is made so that a single lid is fed to the assembly head.

Simultaneously, a spoon 60 and a lid 18 are slid into assembly positions 61 and 19 respectively. The spoon is held in position by the spring loaded friction piece 27. The friction piece is simply a spring loaded bar which urges the spoon against the opposite wall of assembly head to hold it in proper position. The lid is held in position by friction of the guide rails. In position the spoon can only move vertically and the lid can only move horizontally. A plunger 58 is notched to fit the tip of the spoon. The plunger is powered by the solenoid 50 and power is transferred to the plunger by means of the plunger pivot arm 71 pivotally suspended at 75 on the bracket 73 which is suspended from the table 10. The arm 71 pivotally engages the solenoid at 77 and the plunger at 79. The solenoid rod 76 is threaded for adjustability.

The solenoid 50 is actuated by the microswitch 56 operated by cam follower 54. The disc 22 is provided with the adjustable cam 52 which engages the cam follower once each revolution at the point where a lid is in the position 19 and a spoon is in the position 61. The spoon is thereby driven through the lid and into the position 63. The spoon in this position is free from the spring loaded friction piece 27.

At this point the cycle is repeated, the completed lid and spoon combination being pushed out of the assembly head 25 by the following lid and down the slotted channel for positioning on the cup.

The operation of the lid feed slide 14 is essential to this invention and bears further description. It is best shown in FIGURES 4, 5, 6, 7 and 8. Looking at the lid feed slide 14 in plan view FIGURE 4 it is seen that the slide is rounded at its forward edge to conform to the shape of the lid. In elevation (FIGURE 8) forward edge is beveled in both the upward and downward directions to provide a knife edge 90. The lid feed slide bar is provided with separating fingers 12 and 12' which serve to hold the stacked lids while the lid to be fed is separated for feeding by the lid feed slide. The separating fingers are pivotally mounted on the fixed bed of the device at 93 and 93'.

The fingers 12 and 12' grip the lids at the gripper tips 13 and 13'. The opening and closing of the fingers is controlled by the cams 92 and 92' in the sides of the lid feed slide which engage the cam followers 94 and 94' on the separating fingers 12 and 12'. Leaf springs 96 and 96' hold the fingers out of gripping position. When the feed slide moves forward with a single lid the gripper tips engage the lid stack. When the slide returns to its original position the tips move out of gripping position and the stack of lids falls by gravity. The bottommost lid moves into feeding position and is kept separated from the stack by the gripper tips which hold the stack as the feedslide again moves forward.

The completed lid/spoon combination 80 is pushed along the slotted channel 81 by the subsequently assembled lid/spoon combinations to the lid/spoon and cup assembly apparatus as shown in FIGURES 10, 11 and 12.

A cup filled with liquid ice cream 83 is provided on a carrier 85. The carrier can be operated by any suitable means and is not part of the invention herein disclosed. The only requirement is that the cup be provided in synchronous relation with the lid/spoon assemblies. A lid/spoon combination is slid into the cup assembly head 87 by the subsequent train of lid/spoons in the channel 81. A downward capping force is exerted by means of through linkage operated from the cam 89 which is driven by the same motor as the disc 22 of FIGURE 2 and the cam follower 88 which is held in engagement with the cam by the spring 91. The cam follower arm 98 is pivotally mounted at 97 from the bracket 96 hanging from the table 10. The cam follower arm 98 is pivoted at 101, its end opposite the cam follower, to the rod 100 which is slidably extended through the table 10. The rod 100 engages the cup assembly head 87 and causes its vertical capping motion. Subsequent cups are fed to the capping position by means synchronized with the lid/spoon assembly.

FIGURE 12 provides a detail of the capping mechanism. The device shown therein is in capping position, the cap release rods 84 and 84' shown in dotted lines. The cap is held in position by a pair of cap gripper fingers 86 and 86'. These are attached to the spring loaded adjustable mounts 99 and 99' which pivot at 97 and 97'. At the bottom of the stroke the shoulders on the cap release rods 84 and 84' engage the shoulders on the mounts 99 and 99' to cause the fingers to spread and to release the cap. At the same time the body of the lid/spoon and cup assembly head applies the capping pressure.

When the capping head is returned to its uppermost position a new lid/spoon assembly is slid from the slotted channel 81 into the slot 78 in the capping head, simultaneously a fresh cup of liquid confection is provided at 83 for capping.

After the capping operation the completed lid/spoon and cup assemblies are transferred to a freezer unit to finish the process.

It is to be emphasized that the apparatus of this invention is intended for the piercing of a lid by a spoon. The present device and method could, of course, be used with lids which have been pre-slit or pre-slotted to accommodate a spoon. It has been found, however, that the piercing method provides the best seal and avoids the trouble and expense of any sort of pre-preparation of the lid. To conform to hygienic standards the fit between the spoon and the lid must be very tight and the apparatus and process of this invention is capable of providing a highly acceptable fit at a minimal cost.

The lids used can be of any suitable material such as paper or a plastic as polystyrene, polyethylene, polypropylene and the like. Commercially available plastic lids have been used with great success and are preferred. Minor variations in the device would allow the use of a lid which was flat and designed to fit inside the top of the container rather than over the top of the container as the lids which are disclosed herein.

The spoons used in this invention likewise can be made of a variety of materials with the requirement that the spoon be capable of sustaining the force along the longitudinal axis necessary to drive it through the lid. Wood and plastic spoons have been found to be highly satisfactory. Plastic is preferred, however, because of the elimination of the warpage problem and because the vacuum flattening device discussed previously need not be used. It is considered advantageous to taper or sharpen the tip of the spoon handle.

The spoon found to be most suitable for use in this apparatus features a design which has a handle portion with substantially parallel sides with small, substantially perpendicular shoulders on the wider side of the handle. The shoulder is just above the bowl portion and is of the order of a sixteenth of an inch in width. It has a dual purpose. First, it provides a definite stop and defines the depth of the piercing of the spoon through the lid accurately and reproducably. Second, it contributes to an improved seal between the spoon and the lid.

None of these features are necessary for the operation of the present invention. The above disclosed refinements merely provide optimum operation conditions for the disclosed invention.

Many minor variations are envisaged for this invention. For instance, the apparatus and process can be easily adapted for use with a variety of other foods. These would necessarily be in a soft or semi-soft condition when packaged. Examples are frozen custards, soft ice creams, gelatin desserts and puddings.

By changing the design of the assembly head the device disclosed can be used for the insertion of spoons having a shaped bowl having depth rather than the flat spoons disclosed herein.

The striking means disclosed as solenoid operated can be powered by other means such as an air cylinder having a valve.

Those skilled in the art will recognize many variations from the detailed description given herein. The scope of this invention is to be in no way limited to the specific disclosure but only by the appended claims.

We claim:

1. An apparatus for the preparation of containers having fitted lids with spoons projecting through said lids comprising, in combination, means for feeding a stream of liquids, means for feeding a stream of spoons, means for positioning a spoon in substantially perpendicular relation with a lid, means for forcing said spoon through said lid and means for fitting said lid on a container.

2. The apparatus of claim 1 wherein the means for forcing the spoon through the lid comprises means for applying a striking force to the tip of the bowl portion of the spoon and in a direction corresponding substantially to the longitudinal axis of the spoon.

3. The apparatus of claim 2 wherein said means for applying a striking force is solenoid operated.

4. An apparatus for the preparation of containers having fitted lids with spoons projecting through said lids comprising, in combination, an assembly head, means for supplying a stream of lids, means for feeding a single lid to said assembly head, means for supplying a stream of spoons, means for feeding a single spoon to said assembly head in substantial synchronization with said lid feeding means and for positioning the handle of a said single spoon in substantially perpendicular relationship with the underside of said single lid, means for momentarily holding said spoon and lid in said perpendicular relationship, means for striking said single spoon with a force sufficient to drive said spoon partially through said lid, means for advancing said lid/spoon assembly to a capping means and capping means for fitting said lid/spoon combination of a container.

5. The apparatus of claim 4 wherein said means for supplying lids and the means for supplying spoons are gravity means, said means for feeding a single lid is a slide means including cam operated gripper means for holding all but said single lid out of feeding position, said means for feeding a single spoon is a slide means and said striking means is solenoid operated.

6. The process for the preparation of a container having a fitted lid with a spoon projecting through said lid comprising the steps of, positioning a spoon in substantially perpendicular relationship with a lid, forcing said spoon partially through said lid and fitting the lid/spoon combination so formed on a container.

7. The process of claim 6 wherein the forcing is accomplished by striking the spoon at the tip of its bowl with a force directed substantially along the longitudinal axis of the spoon.

8. The process for the preparation of a container having a fitted lid with a spoon projecting through said lid comprising the steps of, supplying a stream of lids, supplying a stream of spoons, feeding a single spoon and a single lid in substantial synchronization, positioning the handle of said spoon substantially perpendicularly with the underside of said lid, forcing said spoon partially through said lid and fitting the lid/spoon combination produced thereby on a container.

9. The process of claim 8 wherein the forcing is accomplished by striking the spoon at the tip of its bowl with a force directed substantially along the longitudinal axis of the spoon.

References Cited

UNITED STATES PATENTS

| 1,834,085 | 12/1931 | Bloom | 229—1.5 |
| 2,175,735 | 10/1939 | Banks | 229—1.5 |

TRAVIS S. McGEHEE, *Primary Examiner.*

R. L. SPRUILL, *Assistant Examiner.*

U.S. Cl. X.R.

53—128